United States Patent [19]

Immel

[11] Patent Number: 4,802,060
[45] Date of Patent: Jan. 31, 1989

[54] APPARATUS FOR CONNECTING A CONTROL PANEL WITH AN AIR CONDITIONING DEVICE

[75] Inventor: Manfred Immel, Mittenaar, Fed. Rep. of Germany

[73] Assignee: Rittal-Werk Rudolf Loh GmbH & Co., KG, Fed. Rep. of Germany

[21] Appl. No.: 164,583

[22] Filed: Mar. 7, 1988

[30] Foreign Application Priority Data

Mar. 30, 1987 [DE] Fed. Rep. of Germany ....... 3710566

[51] Int. Cl.$^4$ ............................................. H05K 7/20
[52] U.S. Cl. ..................................... 361/379; 62/297; 62/298; 165/104.33; 361/385; 361/390
[58] Field of Search ............. 174/15 R, 16 R; 62/297, 62/298, 407, 418, 419; 165/80.4, 80.5, 104.33; 361/382–385, 390, 393, 394, 334, 356, 358, 379

[56] References Cited

U.S. PATENT DOCUMENTS

| | | | |
|---|---|---|---|
| 4,220,014 | 9/1980 | Connors | 62/418 |
| 4,386,651 | 6/1983 | Reinhard | 165/104.33 |
| 4,449,579 | 5/1984 | Miyazaki | 361/385 |
| 4,549,242 | 10/1985 | Nebon | 361/379 |
| 4,744,005 | 5/1988 | Milani | 361/384 |

FOREIGN PATENT DOCUMENTS

3504207 1/1987 Fed. Rep. of Germany .

OTHER PUBLICATIONS

DE–Katalog, "Hitze, Kalte, Stabu, Nasse, Rittal-Schaltschrank-Klimatisierung", Fa. Rittal, Rudolf Loh GmbH & Co. KG in Herborn, eingeg, Feb. 1985, S.8–11.
DE–Katalog, "19-Zoll-Aufbausysteme fur die Elektronik-Industrie", Fa. Schroff GmbH in Straubenhardt bei Pforzheim, Aug. Jul. 1984, S.A62.

Primary Examiner—Gerald P. Tolin
Attorney, Agent, or Firm—Thomas W. Speckman

[57] ABSTRACT

This invention concerns a control panel with an air conditioning device, in which the top of the body of the control panel and the bottom of the air conditioning device are connected to one another and provided with through openings adjusted and aligned to one another. In order for the air conditioning device to be rapidly and easily connected with the control panel, and likewise rapidly and easily removed, this invention provides an intermediary plate with through openings that is solidly connected with the top of the control panel. The through openings of the intermediary plate are adjusted and oriented to the through openings in the top of the body of the control panel. The intermediary plate has an upturned edge on three sides to form an accommodation for the air conditioner. For the detachable connection of the air conditioning device and the intermediary plate locking parts with at least one quick fastener each which are adjusted to one another are attached on the external sides of the edges lying opposite one another of the intermediary plate and the coordinated external sides of the air conditioning device. Insulating and sealing plates may be placed on the top and bottom of the intermediary plate and have corresponding through openings.

16 Claims, 2 Drawing Sheets

APPARATUS FOR CONNECTING A CONTROL PANEL WITH AN AIR CONDITIONING DEVICE

BACKGROUND OF THE INVENTION

1. Field of the Invention

The invention concerns a control panel with an air conditioning device, in which the top of the body of the control panel and the bottom of the air conditioning device are connected to one another and provided with through openings which are adjusted and aligned to one another.

2. Description of the Prior Art

In known control panels having air conditioning devices, screw connections are used to connect the air conditioning device with the top of the body of the control panel, whereby the aligning penetrating openings not only form channels for conducting the connecting cables but also serve as air supply and air exhaust channels. The screw connections between the air conditioning device and the body of the panel not only make the attachment of the air conditioning device to the control panel difficult, they also do not allow any rapid and simple removal of the air conditioning device when changing the air conditioning device or during repair or maintenance work.

SUMMARY OF THE INVENTION

It is an object of this invention to create a control panel with an air conditioning device of the previously-stated type in which the air conditioning device is attached quickly and easily to the control panel, and can likewise be removed quickly and easily from the control panel, without impairing the cable running and the formation of the necessary air channels.

The object of this invention is accomplished by having an intermediary plate with through openings solidly connected with the top of the body of the control panel. The openings of the intermediary plate are adjusted and oriented to the through openings in the top of the body of the control panel. The intermediary plate is provided with an upturned edge on three sides. For removable connection of the air conditioning device and the intermediary plate, locking parts with at least one rapid fastening lock each are positioned aligned with respect to one another and attached to the external sides o the walls of the intermediary plate and the external sides of the air conditioning device which are oriented opposite to one another and inserted into the intermediary plate.

The intermediate plate is solidly connected once with the top of the body of the control panel and remains in this connected position. The air conditioning device is placed on the intermediary plate, whereby the edges of the intermediary plate ensure a defined connection position between the air conditioning device and the intermediary plate. The locking parts of the quick fasteners stand in correct coordination with one another and need only be activated in order to produce the connection between the air conditioning device and the intermediate plate which is solidly connected with the body of the control panel. If the air conditioning device needs to be removed from the control panel, then only the quick fasteners need to be loosened in order to be able to remove the air conditioning device from the accommodation of the intermediary plate. The connection cable leading from the air conditioning device into the control panel and the formation of the air channels between the air conditioning device and the control panel are in no way impaired by the intermediary plate since their through openings are adjusted and oriented to the through openings in the top of the control panel and the bottom of the air conditioning device. In this manner, the same size and form are preferably selected for the through openings which in the assembled position are coordinated then aligned with one another.

The insertion of the air conditioning device into the accommodation of the intermediary plate is accomplished by using quick fasteners which are attached to the narrow sides of the rectangularly-shaped intermediary plate and the rectangularly-shaped air conditioning device, since the rectangularly-shaped air conditioning device can be better held this way.

In order to create a sealed connection between the body of the control panel and the intermediary plate, an additional embodiment of this invention provides that the intermediary plate, through the interposition of a first insulating and sealing plate, is connected with the top of the body of the control panel. The insulating and sealing plate is provided with through openings which are adjusted and aligned to the through openings in the top of the body of the control panel and the through openings of the intermediary plate.

The solid connection between the intermediary plate and the control panel, in accordance with one embodiment, is accomplished by using threaded bolts which are solidly attached to the bottom of the intermediary plate. Such bolts are led through borings of the first insulating and sealing plate and borings in the top of the body of the control panel. Washers are placed over the threaded bolts protruding on the internal side of the top of the body of the control panel onto which nuts are screwed.

In a body of a control panel which can be shut by means of a panel door, the edgeless side of the intermediary plate is, in accordance with one embodiment, oriented on the same side as the door of the control panel, so that even when the control panel is placed on a wall, the air conditioning device can be removed from the accommodation of the intermediary plate, installed on the forward side of the control panel and again removed from the forward side of the control panel.

BRIEF DESCRIPTION OF THE DRAWINGS

This invention will now be further illustrated by means of one embodiment shown in the diagrams. These show the following.

DESCRIPTION OF THE PREFERRED EMBODIMENTS

Figure 1:
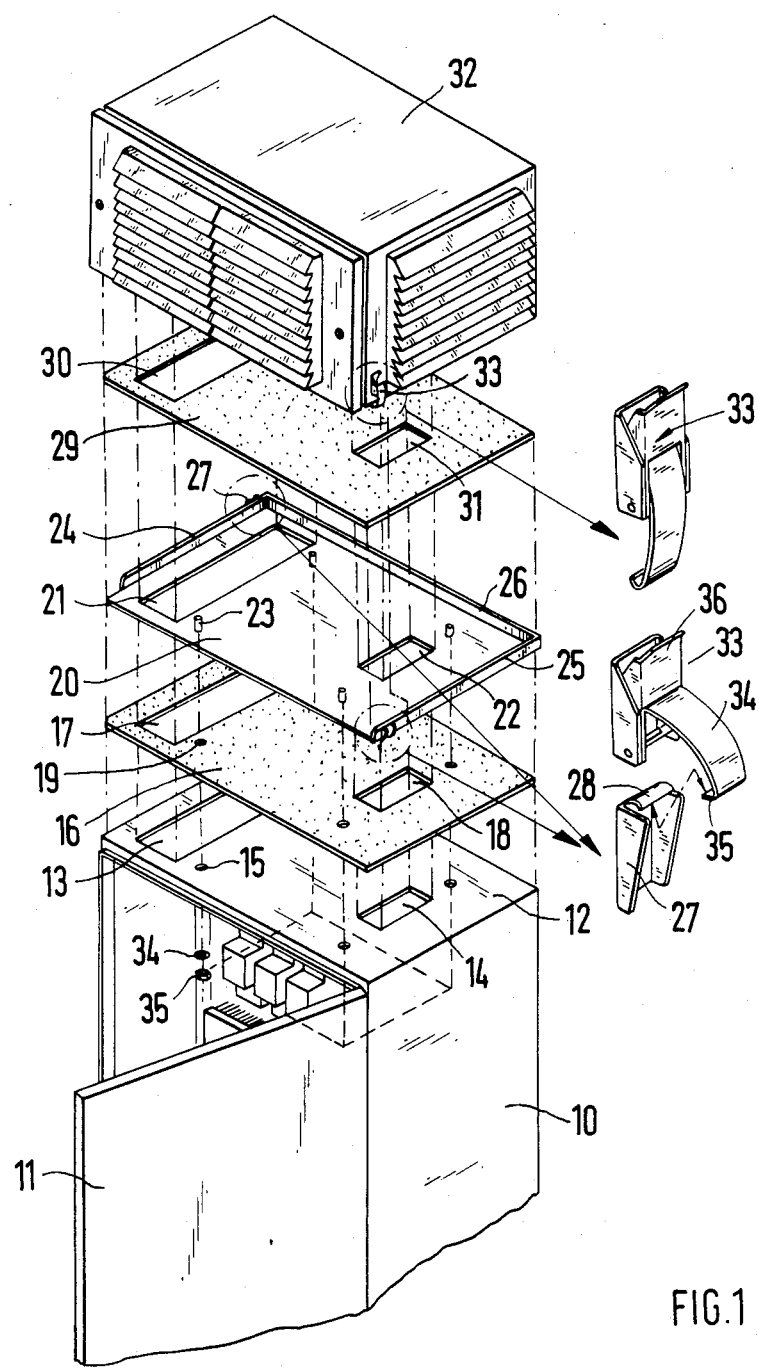
FIG. 1: shows an expanded perspective view of the parts for the removable attachment of an air conditioning device on a control panel.
Figure 2:
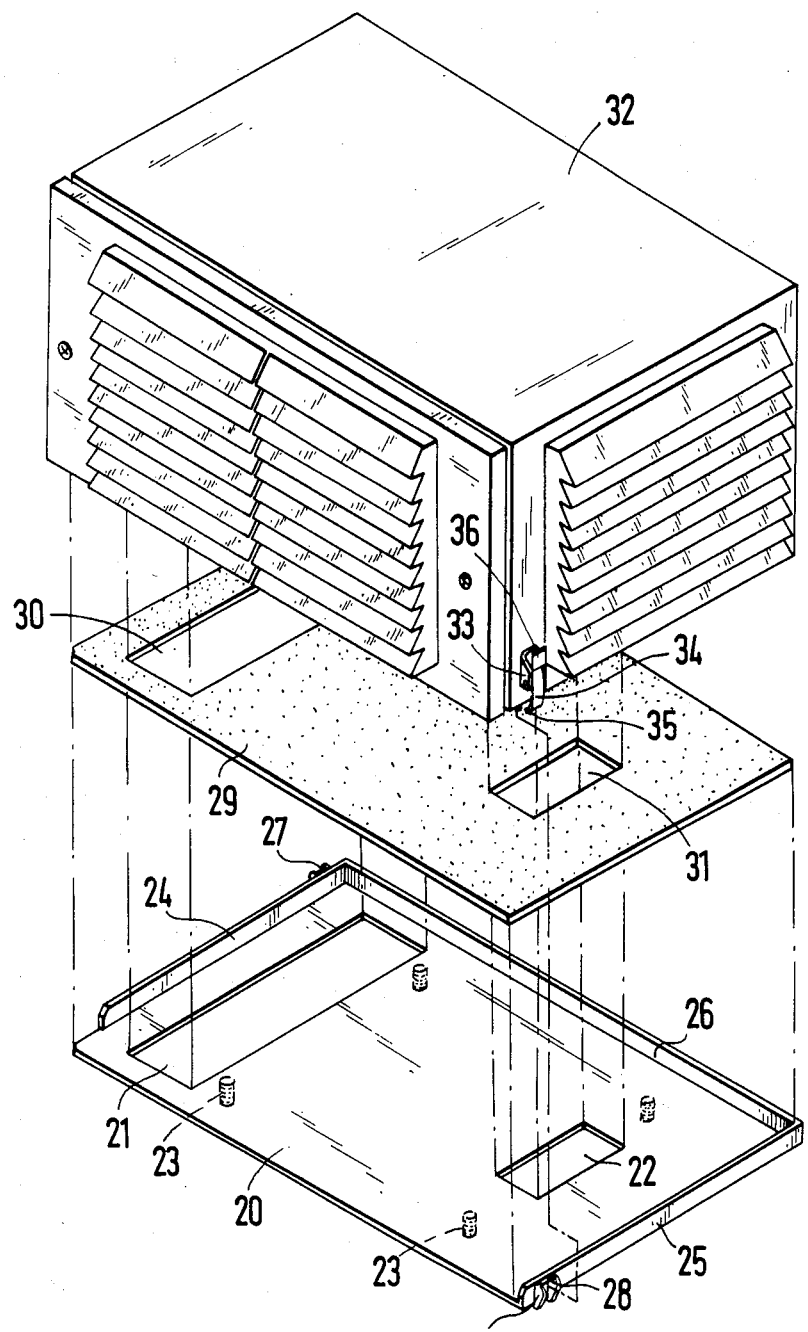
FIG. 2: shows a larger representation than FIG. 1 of the partial area between the intermediary plate and the air conditioning device.

Only the upper part of the control panel is shown in FIG. 1. The body of the control panel (10) is closed on the open forward side by means of the door (11) of the control panel (10). The top (12) of the body of the control panel (10) has the two rectangularly-shaped through openings (13 and 14), which, in shape and size, correspond to the equal through openings in the bottom of the air conditioning device (32). Furthermore, four borings (15) are applied to the top (12) of the body of the control panel (10).

On the top (12) of the body of the control panel (1), the intermediary plate (20) is attached with the interpositioning of the first insulating and sealing plate (16). In this manner, the first insulating and sealing plate (16) has the through openings (17 and 18) and the borings (19), which are adjusted, oriented and aligned to the through openings (13 and 14) and the borings (15) in the top (12) of the body of the control panel (10). Also, the intermediary plate (20) has through openings (21 and 22), which align with the through openings (17 and 18) of the first insulating and sealing plate (16) and the through openings (13 and 14) in the top (12) of the body of the control panel (10) Four threaded bolts (23) are attached to the bottom of the intermediary plate 20, such bolts are oriented to the borings (19) of the first insulating and sealing plate (16) and the borings (15) in the top (12) of the body of the control panel (10). The threaded bolts (23) extend through the borings (19 and 15), and project partially out on the internal side of the top (12) of the body of the control panel (10). Washers (34) are placed on the projecting parts of the threaded bolts (23) and nuts (35) are screwed on, so that the intermediary plate (20), which, for example, is made of metal is insulated and sealed through the interposition of the first insulating and sealing plate (16). The first insulating and sealing plate (16) which, for example, is made of rubber or elastic plastic is thereby firmly connected or screwed on with the control panel. Through this means, the first insulating and sealing plate (16) definitively seals off the transition from the intermediary plate (20) to the top (12) of the body of the control panel (10), particularly in the area of the through openings (13 and 17, and 14 and 18).

The intermediary plate (20) is provided on three sides with an upturned edge (24, 25 and 26). These edges (24, 25, and 26) form an accommodation, which is adjusted in its cross section to the external cross section in the area of the bottom of the air conditioning device (32). The air conditioning device (32) can thus be inserted into the accommodation of the open forward side of the intermediary plate (20), until it abuts on the edge (26). The open forward side of the accommodation of the intermediary plate (20) is oriented on the same side as the door (11) of the control panel (10), so that the air conditioning device (32), even in the case of a control panel installed on a wall, can be placed from the forward side of the accommodation of the intermediary plate (20), and can again be removed from the same.

The locking parts (27) having locking hooks (28) are attached to the external sides of the edges (24 and 25) of the narrow sides of the rectangularly-shaped intermediary plate (20). In this manner, it is sufficient if at least one quick fastener is provided on each side. In this embodiment, both quick fasteners are attached to the end areas of the edges (24 and 25) lying diagonally to one another. The mating locking parts (33) of the quick fasteners are attached correspondingly arranged on the external sides of the narrow sides of the air conditioning device (32), and are provided with the locking levers (34), which, with the angled ends (35), catch behind the locking hooks (28) of the locking parts (27). By means of the activating element (36), the quick fasteners can be tightened by one locking part (27) and one locking part (33) each, and the quick fasteners can be likewise released.

Before the air conditioning device (32) is inserted into the accommodation of the intermediary plate (20), the second insulating and sealing plate (29) is inserted into the accommodation. This second insulating and sealing plate (29) can comprise rubber or elastic plastic, and seals off the transition of the bottom of the air conditioning device (32) to the intermediary plate (20), particularly in the area of the through openings (21 and 22). Thus, the second insulating and sealing plate (29) also has through openings (30 and 31), which align with the through openings (21 and 22) of the intermediary plate (20).

The intermediary plate (20) and the first insulating and sealing plate (16) always remain connected with the top (12) of the body of the control panel (10). The air conditioning device (32) can, however, be connected very quickly and easily with the intermediary plate (20) by means of the quick fasteners, and can likewise be quickly and easily removed from the same. In this manner, the accommodation formed from the edges (24, 25 and 26) of the intermediary plate (20) facilitates the securing of the air conditioning device (32). Since the accommodation also correctly coordinates the locking parts (27 and 33), the quick fasteners can be quickly closed. To remove the air conditioning device (32) from the control panel, the quick fasteners need only to be released. The connecting cable for the air conditioning device (32) ca be conducted through one of the through openings in the control panel. The electrical connection between the control panel and the air conditioning device (32) can, however, also be carried out by means of a plug connector, whereby one plug connector can be attached outside the intermediary plate (20) on the top (12) of the body of the control panel (10), while the other mating plug connector can be attached on the end of a connection cable led out from the air conditioning device (32).

I claim:

1. A control panel with an air conditioning device, in which the top of the body of the control panel and the bottom of the air conditioning device are provided with through openings which are adjusted and oriented to one another and are in communication with one another, comprising:
    an intermediary plate (20) having first through openings (21, 22), said intermediary plate solidly connected to said top (12) of said body of said control panel (10) with said first through openings (21, 22) adjusted and oriented to second through openings (13, 14) in said top (12), said intermediary plate (20) provided on three sides with an upturned edge (24, 25, 26) forming an accommodation;
    and means for detachably connecting said air conditioning device (32) and said intermediary plate (20) comprising a plurality of quick fasteners having locking parts (27, 33), each of said locking parts (27, 33) adjusted to one another, one of said locking parts (27) connected to the external sides of said upturned edges (24, 25) lying opposite one another and the other said locking parts (33) connected to the external sides of said air conditioning device (32) inserted into said accommodation of said intermediary plate (20).

2. A control panel in accordance with claim 1, comprising: said intermediary plate (20) and said air conditiong device (32) having rectangular shape with long and short sides and said quick fasteners being attached to said short sides of said rectangularly-shaped intermediary plate (20) and said air conditioning device (32).

3. A control panel in accordance with claim 2, comprising: said intermediary plate (20), through the interpositioning of a first insulating and sealing plate (16) is connected with said top (12) of said body of said control panel (10), said insulating and sealing plate (16) being provided with third through openings (17, 18), said third through openings being adjusted and oriented to said second through openings (13, 14) in said top (12) of said body of said control panel (10) and said first through openings (21, 22) of said intermediary plate (20).

4. A control panel in accordance with claim 3, comprising: threaded bolts (23) solidly attached to the bottom of said intermediary plate (20), said threaded bolts passing through borings (19) of said first insulating and sealing plate (16) and through borings (15) in said top (12) of said body of said control panel (10); and nuts (35) screwed on the portion of said threaded bolts (23) projecting through the lower side of said top (12) of said body of said control panel (10).

5. A control panel in accordance with claim 4, comprising: said control panel (10) having an open side capable of being closed by a panel door (11), the edgeless side of said intermediary plate (20) being oriented toward said panel door (11) of said control panel (10).

6. A control panel in accordance with claim 5, comprising: a second insulating and sealing plate (29) interpositioned between said intermediary plate (20) and the bottom of said air conditioning device (32), said second insulating and sealing plate (20) fitting within said accommodation of said intermediary plate (20) formed by said edges (24, 25, 26), said second insulating and sealing plate (29) being provided with fourth through openings (30, 31), said fourth through openings (30, 31) being adjusted and oriented to said first through openings (21, 22) of said intermediary plate (20) and fifth through openings located in the bottom of said air conditioning device (32).

7. A control panel in accordance with claim 6, comprising: said quick fasteners being activated manually and being formed as lever fasteners.

8. A control panel in accordance with claim 7, comprising: said accommodation of said intermediary plate (20) formed by said edges (24, 25, 26) adjusted to the external cross section of the bottom of said air conditioning device (32).

9. A control panel in accordance with claim 8, comprising: said first through openings (21, 22), said second through openings (13, 14), said third through openings (17, 18), and said fourth through openings (30, 33) being aligned with one another, and said top (12) of said body of said control panel, said first and second insulating and sealing plates (16, 29), said intermediary plate (20), and the bottom of said air conditioning device (32), having approximately the same size and shape and being oriented relative to one another in an aligning manner.

10. A control panel in accordance with claim 1, comprising: said intermediary plate (20), through the interpositioning of a first insulating and sealing plate (16) is connected with said top (12) of said body of said control panel (10), said insulating and sealing plate (16) being provided with third through openings (17, 18), said third through openings being adjusted and oriented to said second through openings (13, 14) in said top (12) of said body of said control panel (10) and said first through openings (21, 22) of said intermediary plate (20).

11. A control panel in accordance with claim 1, comprising: threaded bolts (23) solidly attached to the bottom of said intermediary plate (20), said threaded bolts passing through borings (19) of said first insulating and sealing plate (16) and through borings (15) in said top (12) of said body of said control panel (10); and nuts (35) screwed on the portion of said threaded bolts (23) projecting through the lower side of said top (12) of said body of said control panel (10).

12. A control panel in accordance with claim 1, comprising: said control panel (10) having an open side capable of being closed by a panel door (11), the edgeless side of said intermediary plate (20) being oriented toward said panel door (11) of said control panel (10).

13. A control panel in accordance with claim 1, comprising: a second insulating and sealing plate (29) interpositioned between said intermediary plate (20) and the bottom of said air conditioning device (32), said second insulating and sealing plate (20) fitting within said accommodation of said intermediary plate (20) formed by said edges (24, 25, 26), said second insulating and sealing plate (29) being provided with fourth through openings (30, 31), said fourth through openings (30, 31) being adjusted and oriented to said first through openings (21, 22) of said intermediary plate (20) and fifth through openings located in the bottom of said air conditioning device (32).

14. A control panel in accordance with claim 1, comprising: said quick fasteners being activated manually and being formed as lever fasteners.

15. A control panel in accordance with claim 1, comprising: said accommodation of said intermediary plate (20) formed by said edges (24, 25, 26) adjusted to the external cross section of the bottom of said air conditioning device (32).

16. A control panel in accordance with claim 1, comprising: said intermediary plate (20), through the interpositioning of a first insulating and sealing plate (16) is connected with said top (12) of said body of said control panel (10), said insulating and sealing plate (16) being provided with third through openings (17, 18), said third through openings being adjusted and oriented to said second through openings (13, 14) in said top (12) of said body of said control panel (10) and said first through openings (21, 22) of said intermediary plate (20) threaded bolts (23) solidly attached to the bottom of said intermediary plate (20), said threaded bolts passing through borings (19) of said first insulating and sealing plate (16) and through borings (15) in said top (12) of said body of said control panel (10), and nuts (35) screwed on the portion of said threaded bolts (23) projecting through the lower side of said top (12) of said body of said control panel (10); and a second insulating and sealing plate (29) interpositioned between said intermediary plate (20) and the bottom of said air conditioning device (32), said second insulating and sealing plate (20) fitting within said accommodation of said intermediary plate (20) formed by said edges (24, 25, 26), said second insulating and sealing plate (29) being provided with fourth through openings (30, 31), said fourth through openings (30, 31) being adjusted and oriented to said first through openings (21, 22) of said intermediary plate (20) and fifth through openings located in the bottom of said air conditioning device (32).

* * * * *